(12) United States Patent
Chandrasekhar et al.

(10) Patent No.: US 6,437,891 B1
(45) Date of Patent: Aug. 20, 2002

(54) INTEGRATED DUAL-WAVELENGTH TRANSCEIVER

(75) Inventors: Sethumadhauan Chandrasekhar, Matawan; Andrew Gomperz Dentai, Atlantic Highlands, both of NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/179,673

(22) Filed: Oct. 27, 1998

(51) Int. Cl.$^7$ ............................................... H04B 10/00
(52) U.S. Cl. ........................ 359/152; 359/173; 257/80
(58) Field of Search .................................. 359/152, 173, 359/188, 195; 385/14; 257/79, 80, 82; 462/458; 656/431; 197/83, 84, 85, 94, 96, 97, 183, 184, 187, 188, 189

(56) References Cited

U.S. PATENT DOCUMENTS

| 4,438,447 A | * | 3/1984 | Copeland et al. ............... 257/82 |
| 4,730,330 A | * | 3/1988 | Plihal et al. ..................... 372/50 |
| 5,347,601 A | * | 9/1994 | Ade et al. ........................ 385/3 |
| 5,357,122 A | * | 10/1994 | Okubora et al. ............... 257/84 |

* cited by examiner

Primary Examiner—Jason Chan
Assistant Examiner—Christina Y Leung
(74) Attorney, Agent, or Firm—Lowenstein Sandler PC

(57) ABSTRACT

In accordance with the invention, an integrated dual wavelength transceiver comprises a multilayer monolithic structure that functions as an optical waveguide, a photodetector, and a light emitter. In an alternative embodiment, second spaced apart portion on the same substrate can provide an amplifier to amplify electrical signals generated by the photodetector.

6 Claims, 5 Drawing Sheets

INTEGRATED DUAL-WAVELENGTH TRANSCEIVER

FIELD OF THE INVENTION

This invention relates to optical communications systems and, in particular, to an integrated dual-wavelength transceiver for such systems.

BACKGROUND OF THE INVENTION

Due to their low-cost and high bandwidth characteristics, optical fibers are utilized in a wide variety of communication systems. Such utilization has been particularly valuable in long-haul systems where the cost of expensive equipment is shared by thousands of individual customers.

Considerable development effort has been directed to devising economical optical fiber systems capable of delivering broadband signals (for example, voice, data and video) directly to customer premises. One such approach involves running optical fiber from a central office to each customer location and providing an optical network unit between the fiber and the customer. An incoming dual wavelength signal, typically 1.3 and 1.5 micrometer wavelengths, can be constantly applied from a central office to each network unit. In each unit, the incoming signal is split into the two wavelength portions. One portion is detected and then applied as an electrical signal to the customer equipment. Another portion is modulated with electrical signals from the customer and then sent back as an optical signal to the central office. An integrated network unit for performing this function is described in applicants U.S. Pat. No. 5,577,138 issued Nov. 19, 1996.

It has more recently become apparent that with increasing demand for bandwidth, in customer originated signals, it would be desirable to provide network units with their own sources of light instead of requiring a constant optical carrier from the central office. However, units providing light sources are conventionally constructed of discrete components, are relatively bulky, and are expensive for large scale deployment. Accordingly there is a need for such a transceiver unit that can be integrated at an economical cost for providing broadband service to individual customers.

SUMMARY OF THE INVENTION

In accordance with the invention, an integrated dual wavelength transceiver comprises a multilayer monolithic structure that functions as an optical waveguide, a photodetector, and a light emitter. In an alternative embodiment, second spaced apart portion on the same substrate can provide an amplifier to amplify electrical signals generated by the photodetector.

BRIEF DESCRIPTION OF THE DRAWINGS

The nature, advantages and various additional features of the invention will appear more fully upon consideration of the illustrative embodiments now to be described in detail in connection with the accompanying drawings. In the drawings.

It is to be understood that these drawings are for purposes of illustrating the concepts of the invention and are not to scale.

DETAILED DESCRIPTION

Figure 1:
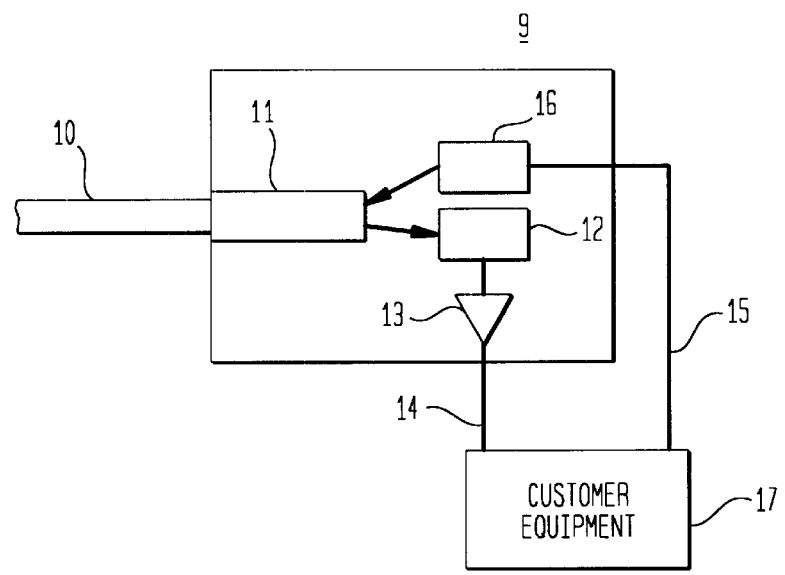
FIG. 1 is a schematic diagram showing the main components and functions of a dual-wavelength transceiver in accordance with the invention.
Figure 2:
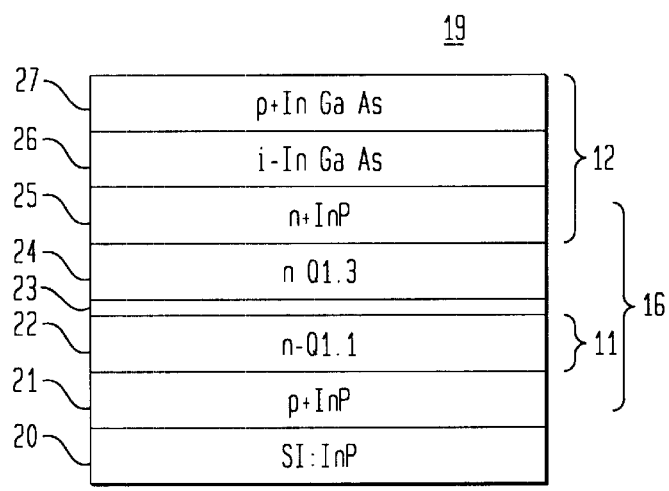
FIG. 2 is a schematic cross section of a multilayered structure from which the primary components of an integrated transceiver can be formed.
Figure 3:
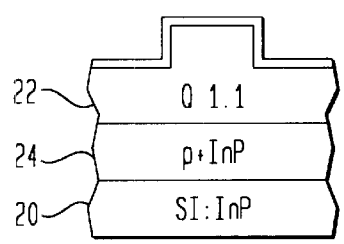
FIG. 3 is a schematic cross section of a waveguide sculptured from the multilayered structure of FIG. 2.
Figure 4:
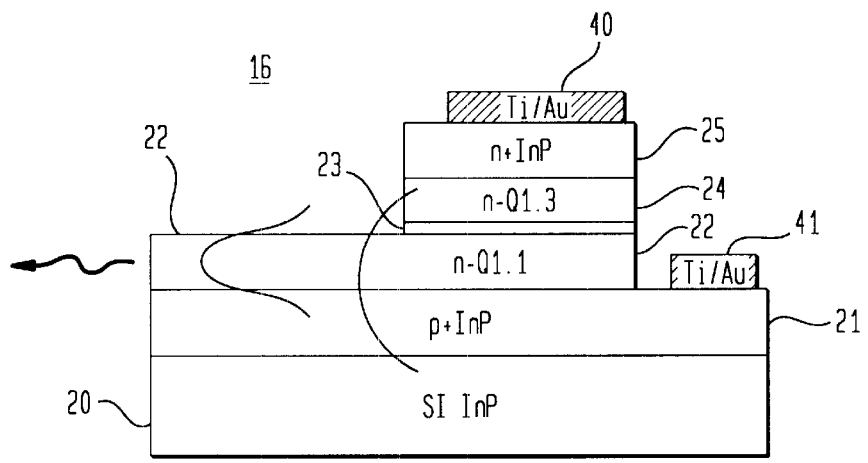
FIG. 4 is a schematic cross section of a light emitter sculptured from FIG. 2.
Figure 5:
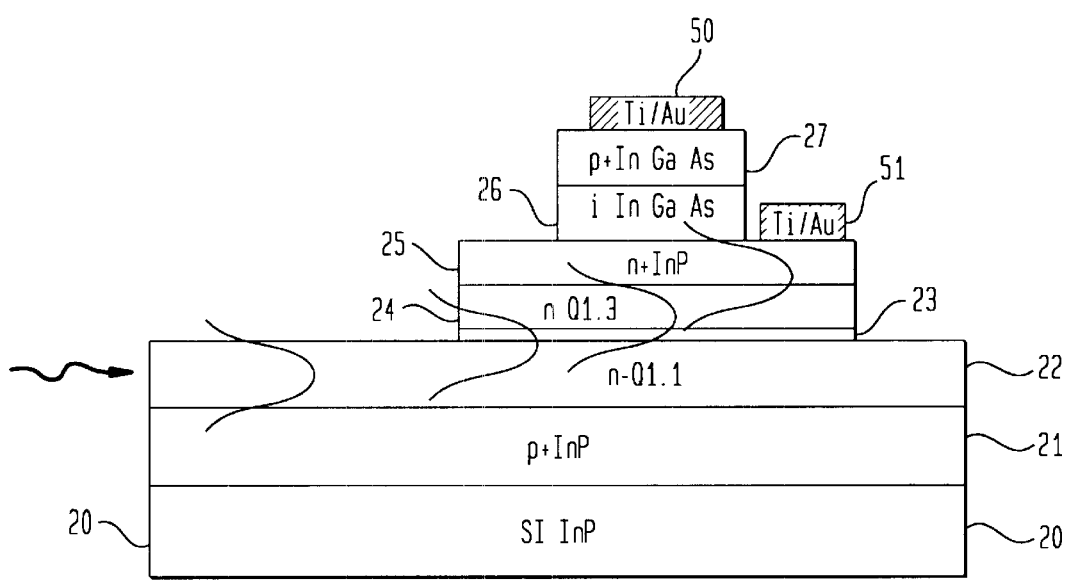
FIG. 5 is a photodetector from FIG. 2.

This invention contemplates the deposition of a sequence of semiconductor layers from which the principal components of a transceiver can be formed. FIG. 1 schematically shows the principal components and how they are interrelated. FIG. 2 shows a sequence of layers from which the principal components can be formed and FIGS. 3–5 are cross sectional views of the components. It should be noted that the layers are chosen and arranged so that three principal components—the photodetector, the light emitter, and the waveguide—can all be sculpted from a common sequence of layers, providing a compact integrated structure and ease of fabrication. FIGS. 6–10 show an alternative embodiment which additionally integrates an amplifying transistor.

FIG. 1 schematically illustrates the primary components and functions of a dual-wavelength transceiver 9. Incoming optical signals at a first wavelength (e.g. 1.5 micrometers) are applied to the unit 9 via an optical fiber 10. Outgoing optical signals at a second wavelength $\lambda_2$ (e.g. 1.3) are generated by the unit. They leave the unit and are propagated by fiber 10.

Incoming optical signals at $\lambda_1$ are directed via a layered waveguide structure 11 to a photodetector 12. The photodetector 12 provides an electrical output signal which is applied via electrical lead 14 to customer premises equipment 17 such as, for example, a modem connected to a computer. In this manner, information impressed on the optical carrier is detected in the transceiver 9 and delivered to the customer. Optionally an amplifier 13 can be provided in lead path 14 to amplify the photodetector output before it is supplied to the customer.

Outgoing information that the customer may wish to transmit is impressed upon electrical signals and transmitted via leads 15 to the transceiver 9. The electrical signal modulates a light emitter 16 (such as a laser or a LED) which generates a modulated optical signal at $\lambda_2$. The layered waveguide structure 11 guides the output optical signal to fiber 10. The layered waveguide, photodetector, and light emitter are all integrated on a common substrate in a monolithic multilayer structure.

FIG. 2 is a multilayered structure 19 comprising substrate 20 and seven epitaxial layers 21–27 from which the photodetector 12, light emitter 16 and waveguides 11 of the transceiver can be sculpted. Thus in a single epitaxial growth, one can grow all the layers required for these components.

The substrate 20 is a standard semi-insulating substrate such as a wafer of indium phosphide doped with iron. It is semi-insulating (resistivity $\geq 10^7$ ohm cm) to provide isolation. Typical iron doping is $4 \times 10^{18}$ atoms/cm$^3$.

The first layer epitaxially grown on the planar surface of substrate 20 is a P$^{30}$ semiconductor layer 21 of indium phosphide. Typical doping is $1\times10^{19}$ atoms/cm$^3$ of zinc and typical thickness is 5000 angstroms.

The next layer grown is a light transmitting layer 22 of n-type semiconductor material to act as a waveguide for optical radiation at both wavelengths of operation (1.3 and 1.5 micrometers). Layer 22 is typically preferably a quaternary layer of InGaAsP having a bandgap corresponding to a 1.1 micrometer wavelength ($Q_{11}$ layer). It can be undoped or lightly doped (n$^-$). Alternatively, the waveguide layer 22 can be any other compatible semiconductor able to guide 1.3–1.55 micrometer light. It can, for example, be a $Q_{12}$ layer with a bandwidth corresponding to 1.2 micrometer wavelength. Typical doping is $5\times10^{15}$ atoms/cm$^3$ of silicon and typical thickness is 3000 angstroms.

The third layer, which is primarily for ease of fabrication, is a stop-etch layer 23 such as a thin layer of n-type indium phosphide. Typical doping is $5\times10^{15}$ atoms/cm$^3$ of silicon. Typical thickness is 50–100 angstroms.

The next layer 24 is preferably a selective light emitting layer of n-type semiconductor such as a quaternary layer of n-doped InGaAsP having a bandgap corresponding to a 1.3 micrometer wavelength (a $Q_{13}$ layer ). It can be doped with silicon (typically $1\times10^{16}$ cm$^3$), and typical thickness is 3000 angstroms.

The fifth layer 25 is an n-type contact layer typically of n$^+$ doped indium phosphide. Typical doping is silicon at a concentration of $8\times10^{18}$ atoms/cm$^3$. Typical thickness is 3000 angstroms.

Layer 26 is a layer of intrinsic semiconductor for light absorption. It can be a 3000 angstrom layer of intrinsic InGaAs (typical doping is $5\times10^{15}$ atoms/cm$^3$ of silicon).

The final layer 27 is a p-type contact layer. It can be p$^+$-doped In GaAs. Typical doping is $2\times10^{19}$ atoms/cm$^3$ of zinc. Typical thickness is 500 angstroms.

In the final device, layer 22 will form the core of the waveguiding structure 11. Layers 21 through 25 will form the light emitter 16, and layers 25–27 will form the photodetector 12.

FIG. 3 shows how the layered structure of FIG. 2 sculptured by etching to form the waveguide 11 of the transceiver 9. The waveguide 11 is defined in layer 22 which, in turn, is supported on layer 21 and substrate 20. The remaining layers are advantageously etched away in waveguiding regions.

FIG. 4 illustrates the layered structure of FIG. 2 can be sculpted to form the light emitter 16 of the transceiver 9. Layers 21–25 comprise the active layers of a PIN light emitter with layer 22 guiding the emitted light out of the transceiver. The active layers are supported on the substrate 20 and the remaining layers are removed. Electrical contacts 40, 41 typically titanium/gold are formed on n$^+$-type contact layer 25 and p-type contact layer 21, respectively, for supplying electrical power.

FIG. 5 shows the layered structure sculpted to form the photodetector 12 of the transceiver 9. Layers 25–27 form the active layers of a PIN photodiode. Layers 24, 23 couple incoming light from layer 22 to the absorption region 26 for detection. Contacts 50, 51 provide access to the electrical output detector.

The devices depicted in FIGS. 3, 4 and 5 are typically fabricated, from the epitaxial material grown in accordance with the layers shown in FIG. 2, in the sequence of processing steps as described in the following. In the region where the photodetector (12 of FIG. 1) is needed, a mesa is etched using a mask defined photolithographically, where the layers 27 and 26 are selectively removed from everywhere except the place where the photodetector is needed. One can use material selective chemical etchants, such as a mixture of one part citric acid solution and one part of hydrogen peroxide solution (called etchant A), to InGaAs. In the second step, again using a mask defined photolithography, layers 25, 24 and 23 are etched as mesas around the photodetector and in the region where the light emitter (16 of FIG. 1) is needed. One can use material selective chemical etchant, such as one part of hydrochloric acid and one part of phosphoric acid (called etchant B), to etch InP (layer 25), etchant A to etch In GaAsP (layer 24), and again etchant B to etch InP (layer 23). In the third step, using a mask defined photolithographically, the waveguide structure shown in FIG. 2 is etched in the InGaAsP material (layer 22). The material is partially removed from everywhere except where the waveguides are needed. The depth to which the layer is etched is typically about 1000 angstroms. One can use another material selective etchant, similar to etchant A, to perform this partial removal. In the fourth step, using another mask, the remaining portion of the layer 22 is etched around the light emitter in order to access the contact layer 21. Finally, using one other mask, mental contacts typically composed of 100 angstroms of Titanium and 1500 angstroms of Gold are selectively deposited on top of layer 27 for the p-contact of the photodetector, on top of layer 25 for the n-contact of the photodetector as well as the n-contact of the light emitter, and on top of the layer 21 for the p-contact of the light emitter.

Figure 6:
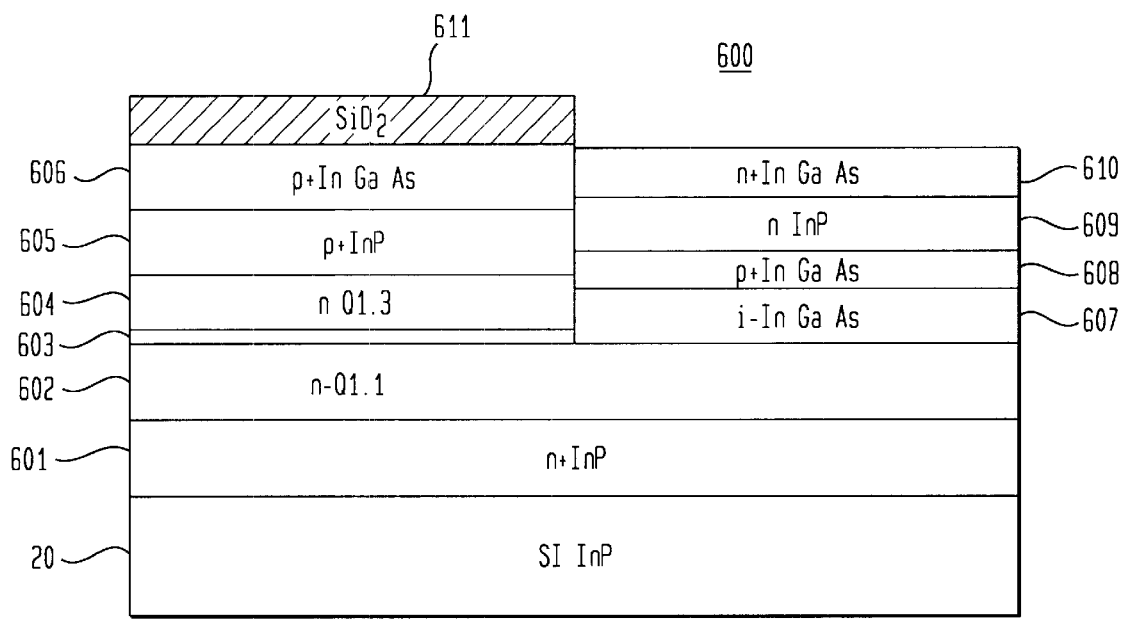
FIG. 6 is an alternative multilayered structure from which the primary components of a transceiver including an amplifier can be formed.

FIG. 6 is an alternate multilayered structure 600 formed by two stages of epitaxial growth. From this structure 600 the photodetector 12, light emitter 16, waveguide 11 and, additionally, a transistor electronic amplifier 13 of the transceiver can be sculpted. The left hand side of the structure 600 shows the sequence of layers 601–606 formed on substrate 20 by the first epitaxy. After the first epitaxy, portions of layers 604–606 are removed and a second epitaxy grows layers 607–610 shown on the right hand side of FIG. 6. A thin protective layer 611 of SiO$_2$ on the first epitaxy masks intact regions of the first epitaxy from growth during the second epitaxy. As will be shown, the emitter 16 and waveguide 11 can be sculpted from the layers of the first epitaxy, and the detector 12 and transistor amplifier 13 can be sculpted from the second.

For the first epitaxy, the layers, their dopings and thicknesses are tabulated below:

| LAYER NO. | MATE-RIAL | TYPICAL DOPANT | TYPICAL CONCENTRATION (atoms/cm$^3$) | TYPICAL THICKNESS (angstroms) |
|---|---|---|---|---|
| 601 | n$^+$InP | Si | $8 \times 10^{18}$ | 5000 |
| 602 | n$^-$Q1.1 | Si | $5 \times 10^{15}$ | 3000 |
| 603 | nInP | Si | $5 \times 10^{15}$ | 100 |
| 604 | n-Q1.3 | Si | $5 \times 10^{15}$ | 3000 |
| 605 | p$^+$InP | Zn | $5 \times 10^{18}$ | 10,000 |
| 606 | p$^+$InGaAs | Zn | $2 \times 10^{19}$ | 500 |

Prior to the second epitaxy, the top layer 606 of the first epitaxy is covered with protective layer 611. The surface is masked, and layers 611 and 604–606 are removed in regions where the detector 12 and the amplifier 13 are to be formed. The resulting structure is subjected to a second epitaxy. For the second epitaxy, the layers, their dopings and thicknesses are tabulated below:

| LAYER NO. | MATERIAL | TYPICAL DOPANT | TYPICAL CONCENTRATION (atoms/cm$^3$) | TYPICAL THICKNESS (angstroms) |
|---|---|---|---|---|
| 610 | n$^+$InGaAs | Si | $2 \times 10^{19}$ | 500 |
| 609 | nInP | Si | $5 \times 10^{17}$ | 1000 |
| 608 | p$^+$InGaAs | Zn | $2 \times 10^{19}$ | 500 |
| 607 | i InGaAs | Si | $5 \times 10^{15}$ | 5000 |

As indicated, layers 601–606 will form the active layers of the emitter 16. Layers 602, 607 and 608 form the active layers of the photodetector 12, and layer 602 is the core of the waveguiding structure 11. Layers 601, 602 and 607–610 form the active areas of the amplifying transistor.

Figure 7:
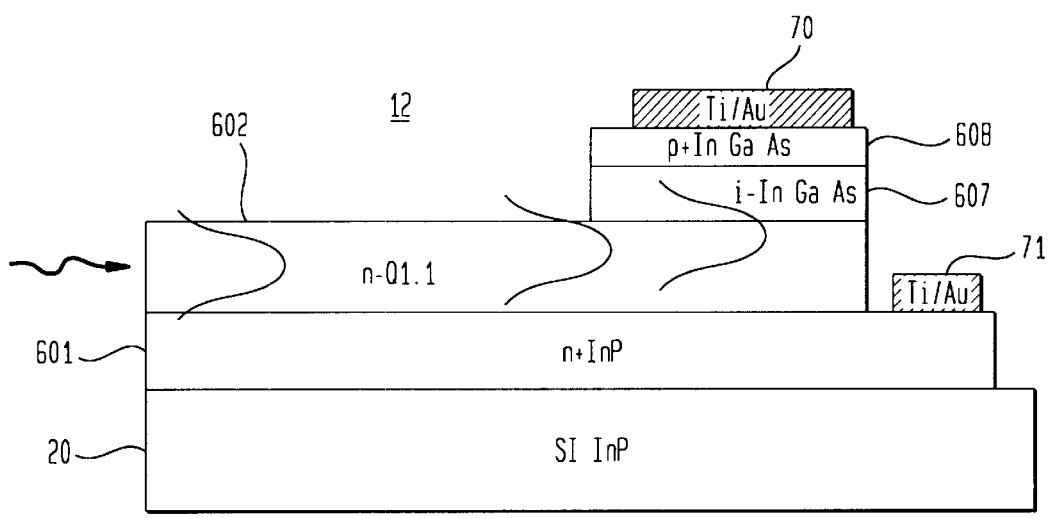
FIGS. 7, 8 and 9 show the photodetector, light emitter and amplifier sculpted from FIG. 6.

FIG. 7 shows the layered structure sculpted to form a photodetector 12. The layers 601, 602, 607 and 608 form the active layers of a PIN photodiode. Layer 602 couples incoming light into the active region for detection. Ti/Au contacts 70, 71 provide the electrical output of the detector.

Figure 8:
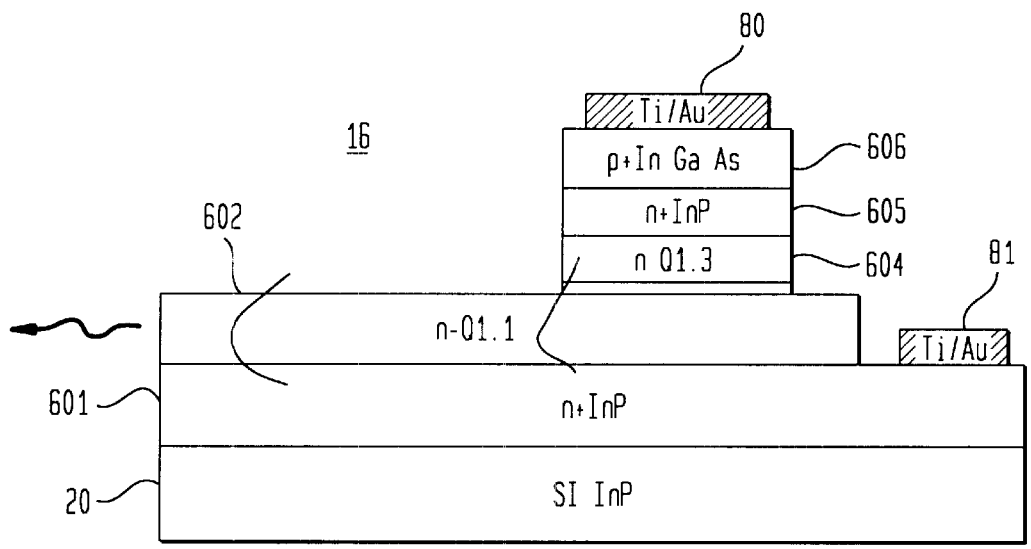

FIG. 8 shows how the layered structure of FIG. 6 can be sculptured by etching to form the light emitter 16 of the transceiver 9. Layers 601–606 comprise the active layers of a PIN light emitter with layer 602 guiding the emitted light out of the transceiver. Electrical contacts 80 and 81, typically titanium/gold, are formed on p$^+$-type contact layer 606 and n$^+$-contact layer 601.

Figure 9:
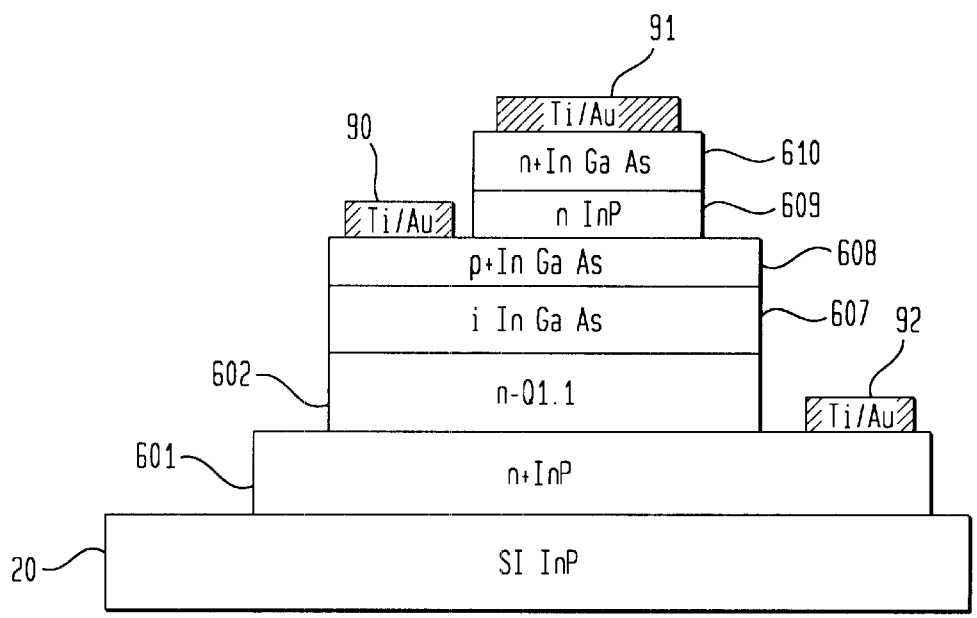

FIG. 9 illustrates the sculpting of amplifying transistor 13 from the layers of FIG. 6. Layers 601, 602 and 607–610 form an npn transistor. Ti/Au contacts 90, 91 and 92 provide the base, emitter and collector contacts, respectively.

Figure 10:
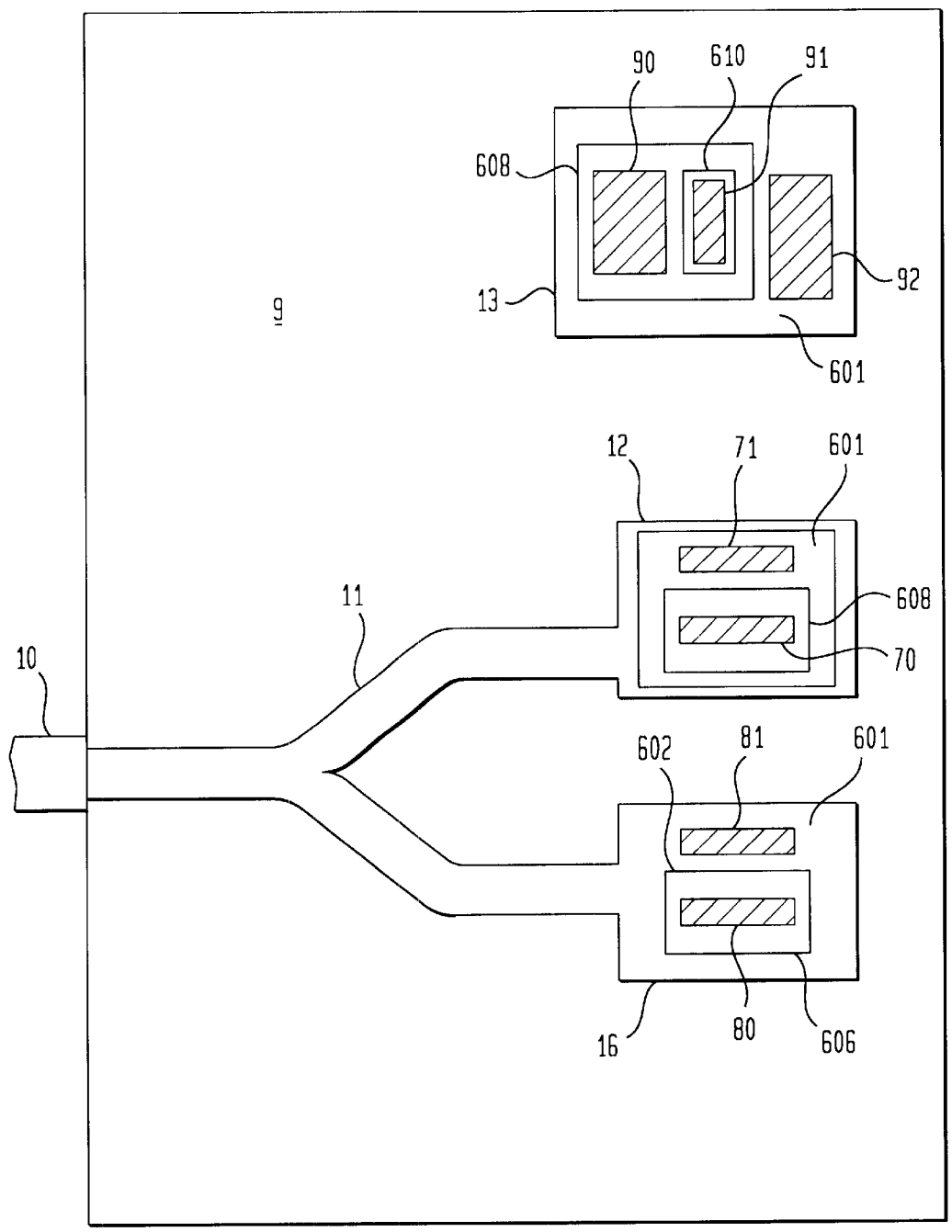
FIG. 10 is a top view of an exemplary transceiver containing the components of FIGS. 7–9.

FIG. 10 is a top view of an exemplary layout of a transceiver 9 made using the two-epitaxy layered structure of FIG. 6. The waveguide 11 splits with one part carrying light to detector 12 and the other part carrying $\lambda_2$ light from emitter 16. Metallization paths (not shown) carry the electrical output of photodetector 12 to transistor amplifier 13.

Aside from the fact that the layered structure of FIG. 6 is grown in two stages of epitaxial growth, the devices in FIGS. 7, 8 and 9 are fabricated by process similar to those described for the sculpturing of the FIG. 2 structure.

In operation, light of one wavelength, e.g., $\lambda_1=1.5$ micrometer, from an external fiber 10 enters the device via waveguide 11. It is detected by the photodetector 12 comprising layers 25, 26, 27 and converted to an electrical signal. The electrical signal is amplified by amplifier 13 and the electrical signal is transmitted to the customer 17. An electrical signal from the user is supplied to the light emitter 16. The emitter 16 generates a correspondingly modulated optical signal at a second wavelength, e.g. $\lambda_2=1.3$ micrometers, which couples into waveguide 11 for transmission to the optical fiber 10.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

What is claimed is:

1. An integrated dual-wavelength optical transceiver comprising a multilayered structure composed of a plurality of epitaxial semiconductor layers, the transceiver comprising: an optical input and an optical output; a photodetector for detecting an optical input signal of a first wavelength $\lambda_1$; a light emitter for generating an optical output signal of a second wavelength $\lambda_2$ different from $\lambda_1$ in response to an input electrical signal; and a waveguide structure for receiving the optical input signal from the optical input and transmitting the input signal to the photodetector and for receiving an optical output signal from the light emitter and transmitting the output signal to the output;

wherein the multilayered structure comprises in sequence:
 a. a substrate;
 b. a p-type semiconductor layer;
 c. an n-type semicondutor layer for emitting light at $\lambda_1$ and $\lambda_2$;
 d. an etch-stop layer;
 e. an n-type semiconductor layer for emitting light at $\lambda_2$;
 f. an n-type contact layer; an intrinsic semiconductor layer; and
 g. a p-type contact layer;

layers e, f and g comprising the photodetector, layers b, c and e comprising the light emitter and layer c comprising the core of the waveguiding structure.

2. The transceiver of claim 1 wherein the light emitter is a PIN diode.

3. The transceiver of claim 1 wherein the photodetector is a PIN diode.

4. The transceiver of claim 1 wherein the multilayered structure comprises layers of indium phosphide and indium gallium arsenide.

5. The transceiver of claim 1 wherein the light emitter is a light emitting diode.

6. The transceiver of claim 1 wherein the light emitter is a laser.

* * * * *